3,681,265
PREPARATION OF INORGANIC POLYMERS
Paul C. Krueger, Warren, N.J., assignor to Air Products and Chemicals, Inc., Allentown, Pa.
No Drawing. Continuation of application Ser. No. 741,349, July 1, 1968. This application Aug. 3, 1970, Ser. No. 64,137
Int. Cl. C08g 33/16, 33/20
U.S. Cl. 260—2 P          8 Claims

ABSTRACT OF THE DISCLOSURE

Polymers having an inorganic backbone are prepared by reacting trivalent cobalt salts or trivalent manganese salts with a phosphinic acid in the presence of an organic solvent at temperatures of 75 to 150° C.

---

This application is a continuation of application Ser. No. 741,349, filed July 1, 1968, now abandoned.

This invention relates to polymers having a high degree of thermal stability, chemical inertness and oxidative resistance and more specifically to a novel method for the preparation of such polymers.

Generally, although aliphatic type organic polymers are workable at low temperatures, these polymers lack high thermal stability, oxidative resistance and chemical inertness at temperatures above about 200° C. U.S. Pat. No. 3,255,125 issued June 7, 1966 discloses novel coordination polymers and, more particularly, novel polymers involving a doubly bridged bivalent tetrahedral metal wherein the polymer backbone is entirely inorganic. It is proposed in that patent to prepare such polymers by the reaction of a phosphinic acid with a bivalent tetrahedral metal acetylacetonate or acetate, with or without a basic catalyst such as pyridine. Alternatively an alcohol or a ketone (e.g. ethanol or acetone) solution may be used with the metal acetate. Another procedure disclosed therein is a direct fusion technique in which the reactants are merely heated until fusion occurs, and the product forms. The preferred technique therein involves an interfacial polymerization wherein the bivalent tetrahedral metal salt is dissolved in one solvent and the reacting phosphinic acid compound is dissolved in a second solvent immiscible with the first. With vigorous mixing or high speed agitation of the two solutions, as in a high speed blender or disperser, reaction occurs at the interface of the solutions and the product solid which forms a simply separated by filtration, centrifugation or the like. Essentially, therefore, the preparation of such polymers has involved the reaction of a divalent metal compound with phosphinic acids via a ligand exchange reaction.

It is the object of this invention to provide a novel process for the preparation of polymers involving doubly bridged bivalent tetrahedral metals wherein the polymer backbone is entirely inorganic.

Other and further objects, features and advantages will appear to those skilled in the art from the following description of the invention.

It has now been found that polymers involving doubly bridged bivalent tetrahedral metals and having a backbone which is entirely inorganic can be prepared using less expensive, readily available trivalent metal compounds as the source of the metal by a reduction-oxidation reaction mechanism. Specifically, it has been found that inorganic polymers having improved thermal stability, chemical inertness and oxidative resistance can be obtained by reacting trivalent cobaltic or manganic salts with various phosphinic acids in organic solvents such as benzene, toluene or xylene. It would appear, therefore, that the new reaction mechanism of the process of this invention involves the reduction of the trivalent metals to divalent metals and an exchange of ligands to yield polymers. Since a reduction requires an oxidation, and the reaction takes place in benzene or the like, it appears reasonable that the acetylacetonate ligand, if cobalt or manganese triacetylacetonate is the metal compound used, is oxidized rather than a solvent molecule. The polymers prepared in accordance with the present invention not only possess outstanding thermal stability, chemical inertness and oxidative resistance but also are unique in possessing a fibrous or crystalline structure. The products of the above-mentioned patent on the other hand are described as powders. In view of their thermal stability, chemical inertness and oxidative resistance, the polymers produced in accordance with the present invention can be combined with conventional plasticizing agents such as tricresyl phosphate and molded into very useful, heat and chemically resistant gaskets and the like.

The trivalent manganese and cobalt compounds used in accordance with the present invention include manganic and cobaltic acetates, carbonates, acetylacetonates and the like. Manganic and cobaltic acetylacetonates are preferred because they are soluble in organic solvents, are easily purified, and are readily available.

The phosphinic acids that may be used for the preparation of polymers in accordance with the present invention include dialkyl acids such as diethyl-, dipropyl-, dibutyl-, di-n-hexyl-, dioctyl-, octyldecyl-, didodecyl-, dicyclohexyl-phosphinic acids, diphenyl-, ethylphenyl-, t-butylphenyl-, hexylphenyl-phosphinic acids and the like. It is preferred to use diphenylphosphinic acid because the bridging group contains resonance stabilized aromatic groups and a phosphorous atom capable of participating in $d\pi$-$p\pi$ bonding. This type of bonding should allow delocalization of electrons to occur.

The trivalent manganese and cobalt compounds and the phosphinic acids are reacted in a ratio of one mole of the former to at least two and preferably about three moles or more of the phosphinic acid. The reaction is effected at temperatures of from about 75° to 150° C. Accordingly, the reaction is conveniently carried out in solvents such as xylene, toluene, benzene, ethanol, pyridine and dioxane. The preferred solvents are xylene and xylene-ethanol mixtures. The reaction period may range from about two hours to about seventy two hours. The solid polymer products are recovered from the reaction mixture by filtration or centrifuging and then purified by washing with suitable solvents.

The following examples will serve to illustrate some preferred embodiments of this invention. It will be understood that this example is merely illustrative and the scope of this invention is defined only by the claims appended hereto.

EXAMPLE I

A mixture of tris-(acetylacetonato)-manganese (III) and diphenyl phosphinic acid in a one to three mole ratio was heated in xylene at reflux temperature from two to sixty hours. The resulting slurry was filtered hot through a coarse porosity frited glass funnel. After the residue was washed with xylene and acetone, it was air dried and extracted with ethanol. A white fibrous product formed as refluxing commenced and the reaction appeared to be rapid.

This product appeared similar to asbestos and left a mat of fibers on the frited glass funnel after filtration. Electronphotomicrographs indicated the product was fibrous and X-ray powder patterns suggested the fibers were amorphous with a slight degree of crystalline character. Differential thermal analysis indicated that the sample size decreased at 350° C. These fibers softened at around 540° C. in air.

EXAMPLE II

A mixture of 5.00 g. of diphenylphosphinic acid and 2.70 g. of manganese (III) acetylacetonate was heated with 200 ml. of xylene at reflux for 3 hours and filtered hot through a coarse porosity fritted glass funnel. The residue was washed with xylene and acetone. After the fibrous product had been vacuum dried, it weighed 3.20 g. During heating some of the xylene was distilled off so that if the by-product acetylacetone formed an azeotrope with xylene and the azeotrope boiled at a temperature below that of boiling xylene, the azeotrope would be distilled over and force the condensation reaction to the right. The residue of a 24 hr. ethanol extraction was vacuum dried and then analyzed.

Calcd. for $C_{24}H_{20}P_2O_4Mn$ (percent): C, 58.91; H, 4.12; P, 12.66; Mn, 11.23. Found for $[Mn(OPh_2PO)_2]$ (percent): C, 58.84; H, 4.23; P, 12.40; Mn, 11.21.

A differential thermal analysis of the polymer indicated that two endotherms occurred at 240° and 350° C. A thermogravimetric analysis showed that a 5% weight loss occurred at 525° and a 10% weight loss occurred at 540° C.

Low solubility of the polymer in solvents caused problems in molecular weight determination. X-ray data of the fibrous polymer could not be used because the powder patterns were diffuse. These diffuse patterns suggested that the products were polymeric.

The electrical resistivity of one sample of the fibrous polymer was $1.08 \times 10^{10}$ ohm cm. at room temperature. The fibers took on static charges very easily as they were placed in glass sample vials using stainless steel spatulas.

The polymer was compounded with PVC (polyvinyl chloride). The flow characteristics of a 5% manganese (II) diphenylphosphinate-95% PVC were increased over that of PVC alone. This behavior was suggested to be caused by some type of "internal lubrication."

EXAMPLE III

A mixture of 1.63 g. of tris(acetylacetonato)cobalt (III) and 3.00 g. of diphenylphosphinic acid was heated with 100 ml. of xylene at reflux for 3 hrs. and the resulting hot, blue crystalline suspension was filtered off on a medium porosity fritted glass funnel. The residue was washed with xylene, acetone, and ethanol before drying. After the residue had been extracted with ethanol for 24 hrs., it was air dried for 72 hrs. and then vacuum dried at 70° C. for 1 hr. The weight of the product obtained was 1.45 g.

Calcd. for $C_{36}H_{30}P_3O_6Co$ (+3 compound) (percent): C, 60.86; H, 4.26; P, 13.08; Co, 8.29. Found (percent): C, 55.85; H, 4.24; P, 12.40; Co, 11.2. Calcd. for $C_{24}H_{20}P_2O_4Co$ (+2 compound) (percent): C, 58.44; H, 4.09; P, 12.56; Co, 11.95.

EXAMPLE IV

A sample of the tris(acetylacetonato)cobalt (III) compound was recrystallized from xylene to remove possible impurities therefrom. The procedure of Example III was repeated using the purified cobalt compound. In this preparation, the product from the reaction was extracted with ethanol for 24 hrs. immediately after the washings had been completed and the blue crystals had been dried in air for ½ hr. The residue from the ethanol extraction was vacuum dried for 2 hrs. at 70° C. before being analyzed. It weighed 1.50 g. Calcd. for $C_{24}H_{20}P_2O_4Co$ (percent): C, 58.44; H, 4.09; P, 12.56; Co, 11.95. Found (percent): C, 58.33; H, 4.31; P, 12.21; Co, 11.48.

A blue fibrous product from the ethanol extraction flask was washed with ethanol, then acetone and vacuum dried. The vacuum dried polymer analyzed as follows: C, 58.85; H, 4.68; P, 12.15; Co, 12.50.

A differential thermogram of this cobalt derivative showed an endotherm occurred at 363° C. although the sample appeared unchanged. An infrared spectrum of the product after DTA was the same as an infrared spectrum of the sample before DTA.

Thermogravimetric analysis showed that a 5% weight loss occurred at 560° C. and a 10% weight loss occurred at 575° C.

In contrast to the above characteristics of the cobalt products produced in accordance with the present invention, the above-cited patent in Example 5 discloses the fusion of tris(acetylacetonato)-cobalt (III) with diphenylphosphinic acid to produce a product which is similar in composition but which is olive green in color rather than blue, and which is thermally stable only to approximately 440° C. rather than about 560° C. Moreover, there is no disclosure or suggestion in that patent of the production of any fibrous products such as are obtained in accordance with the present invention.

It will be apparent that various changes and modifications may be made without departing from the scope of the invention as defined in the appended claims. For example, the solvents mentioned above are merely illustrative and, in general, other normally-liquid hydrocarbons, e.g. aromatic hydrocarbons or aliphatic hydrocarbons, or alcohols, e.g. alkyl alcohols, or ethers, or amino bases or the like can be employed. Preferably, the solvents of this character have boiling points within the range of 75 to 150° C.

I claim:

1. A process of directly preparing by an oxidation-reduction reaction fibrous polymers having an inorganic backbone which process comprises, reacting a trivalent metal salt which is trivalent cobalt or manganese carbonate, acetylacetonate or acetate with a dialkyl, dicyclohexyl or diphenyl phosphinic acid in the presence of an aromatic hydrocarbon solvent at temperatures of from about 75° C. to about 150° C. to form directly in the reaction mixture fibers of a solid fibrous polymer containing bivalent tetrahedral cobalt or manganese, and separating said fibers from the reaction mixture.

2. A process as defined in claim 1, wherein the trivalent salt is a cobalt salt.

3. A process as defined in claim 1, wherein the trivalent salt is a manganese salt.

4. A process as defined in claim 1, wherein the aromatic hydrocarbon is benzene, toluene or xylene.

5. The process as defined in claim 2 in which the cobalt salt is tris(acetylacetonate) cobalt (III), the phosphinic acid is diphenylphosphinic acid.

6. The process as defined in claim 2 in which the cobalt salt is cobalt triacetate, the phosphinic acid is diphenylphosphinic acid.

7. The process as defined in claim 3 in which the manganese salt is manganese (III) acetylacetonate, the phosphinic acid is diphenylphosphinic acid.

8. The process as defined in claim 3 in which the manganese salt is manganese triacetate, the phosphinic acid is diphenylphosphinic acid.

References Cited

UNITED STATES PATENTS

| 3,197,436 | 7/1965 | Block et al. | 260—2 |
| 3,255,125 | 6/1966 | Block et al. | 260—2 |

OTHER REFERENCES

Coates et al., "Journal Chemical Society," London, June 1962, pp. 2523–2525.

SAMUEL H. BLECH, Primary Examiner

US. Cl. X.R.

260—2 M, 30.6 R, 899